United States Patent
Devilliers et al.

(10) Patent No.: US 6,315,339 B1
(45) Date of Patent: Nov. 13, 2001

(54) VEHICULAR SHOCK ABSORBER

(75) Inventors: Olivier Devilliers; Guillaume Berger, both of Langres; Thierry Roussel, Montsesson, all of (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/292,515

(22) Filed: Apr. 15, 1999

(30) Foreign Application Priority Data

Apr. 15, 1998 (FR) .................................................. 98 04681

(51) Int. Cl.⁷ ................................................... B60R 19/03
(52) U.S. Cl. ............................ 293/132; 293/133; 293/120
(58) Field of Search .................................... 293/120, 133, 293/132, 136

(56) References Cited

U.S. PATENT DOCUMENTS

| | | |
|---|---|---|
| 3,231,454 | 1/1966 | Williams . |
| 3,778,093 * | 12/1973 | Renner ................................ 293/120 |
| 3,877,741 * | 4/1975 | Wilfert et al. ...................... 293/120 |
| 3,933,387 * | 1/1976 | Salloum et al. ..................... 293/120 |
| 3,938,841 * | 2/1976 | Glance et al. ....................... 293/120 |
| 3,995,901 * | 12/1976 | Filbert et al. ....................... 293/136 |
| 4,022,505 * | 5/1977 | Saczawa .............................. 293/120 |
| 4,106,804 * | 8/1978 | Scrivo .................................. 293/120 |
| 5,293,973 | 3/1994 | Thum . |
| 5,399,406 | 3/1995 | Matsuro et al. . |
| 5,725,266 * | 3/1998 | Anderson et al. .................. 293/120 |

FOREIGN PATENT DOCUMENTS

| | | |
|---|---|---|
| 4239460 | 5/1994 | (DE) . |
| 19522575 | 1/1996 | (DE) . |
| 19537186 | 4/1996 | (DE) . |
| 2747445 | 10/1997 | (FR) . |

* cited by examiner

Primary Examiner—Joseph D. Pape
(74) Attorney, Agent, or Firm—Oliff & Berridge, PLC

(57) ABSTRACT

A shock absorber for a motor vehicle, having a bumper, a bumper shield and a cross-member interconnecting two side rails of the vehicle, comprising only one layer comprising a single sheet having an undulating section defining undulating shapes each having a concavity, wherein the shock absorber is interposed between the cross-member and the bumper shield, the concavity having an axis which is substantially parallel to a direction of impact, and the shock absorber is to primarily absorb energy from an impact.

21 Claims, 4 Drawing Sheets

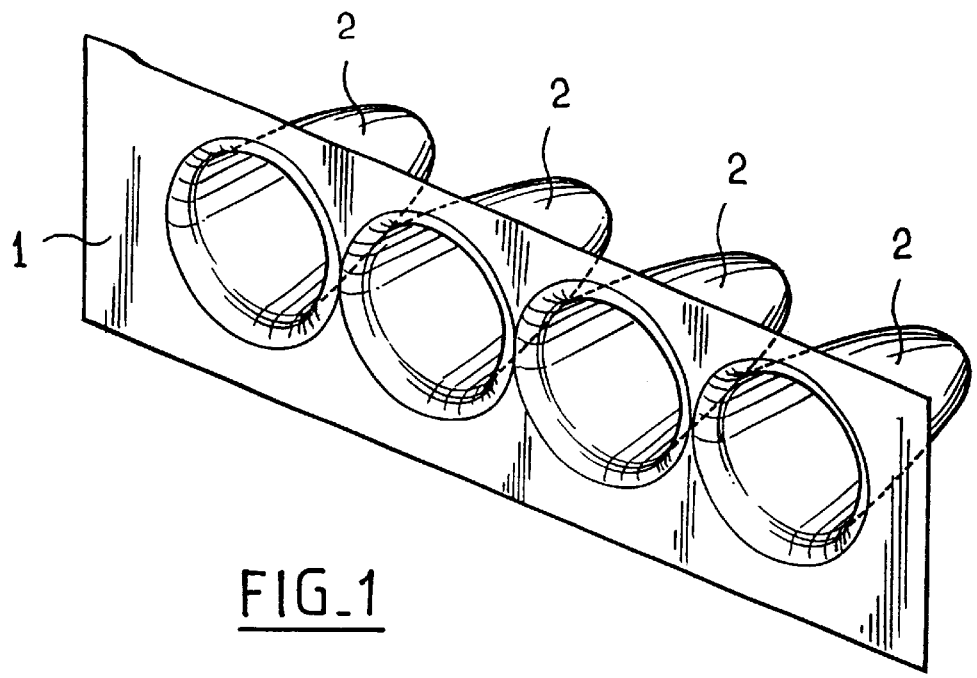
FIG_1
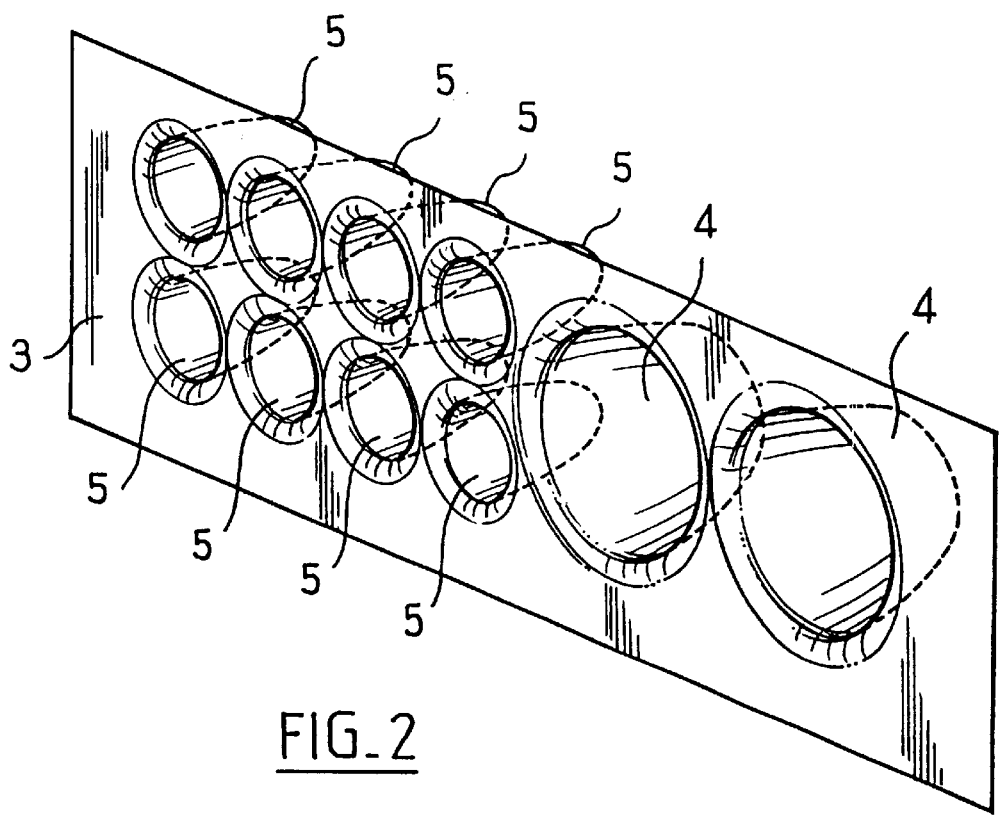
FIG_2

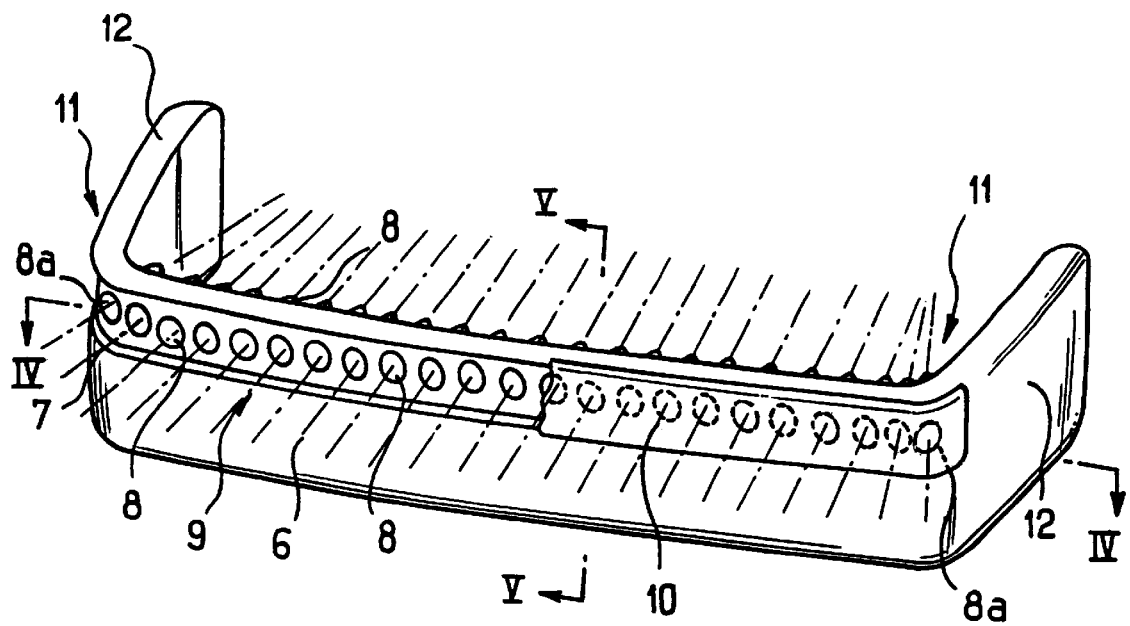
FIG_3
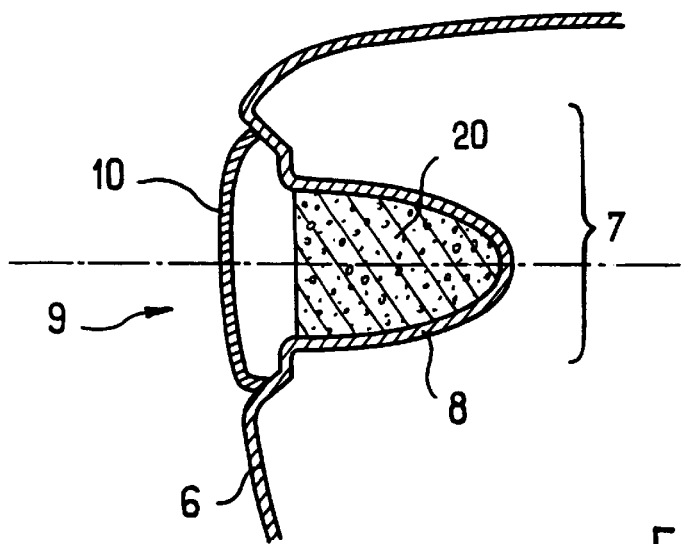
FIG_5

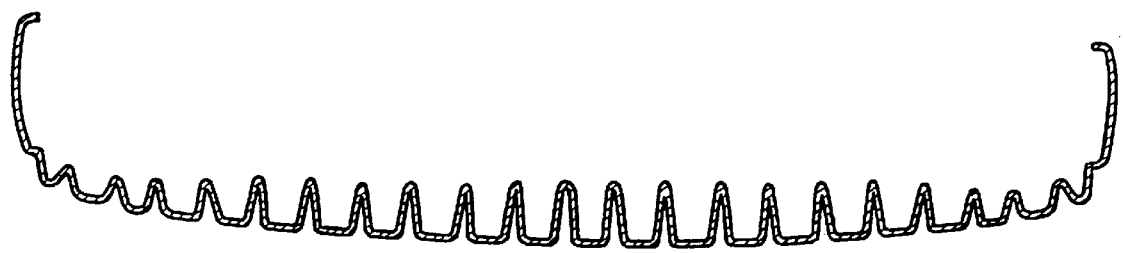
FIG_4
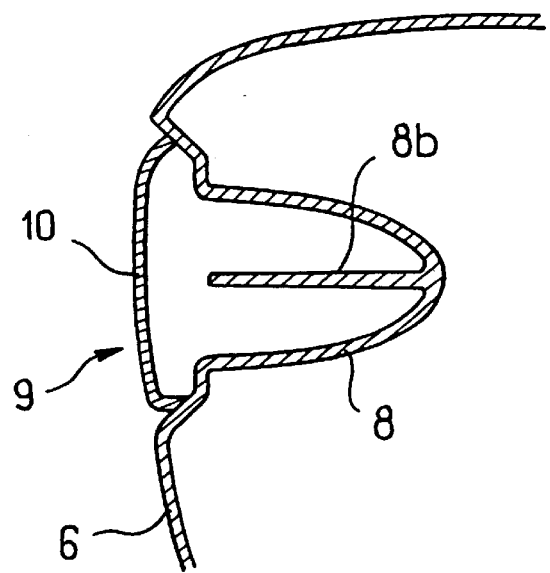
FIG_6

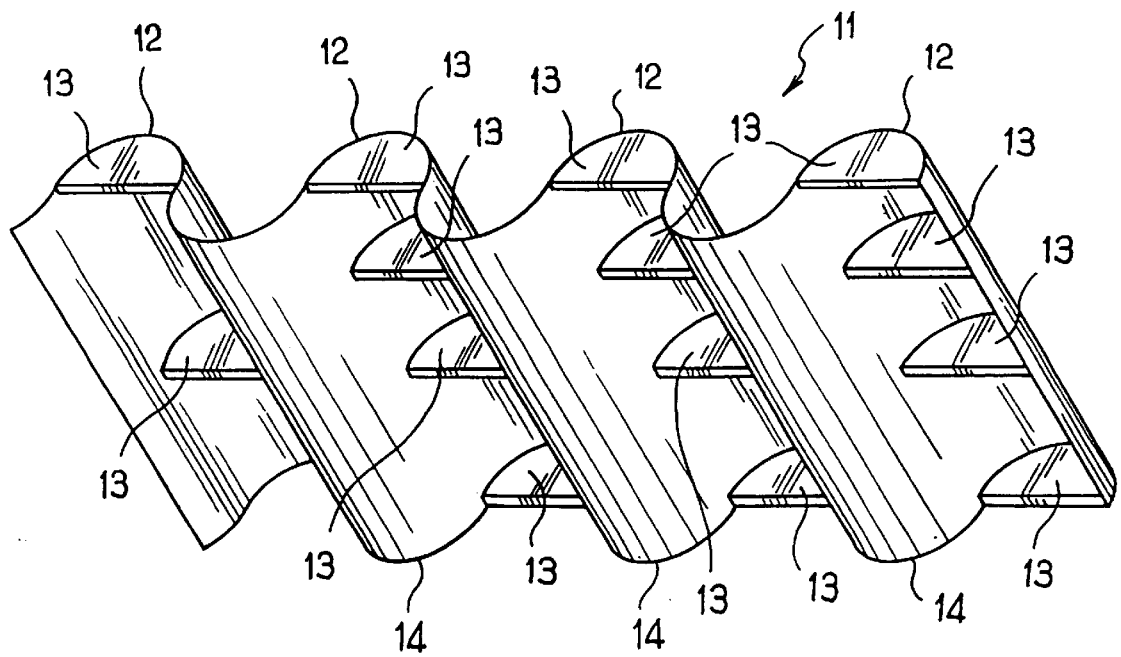
FIG_7
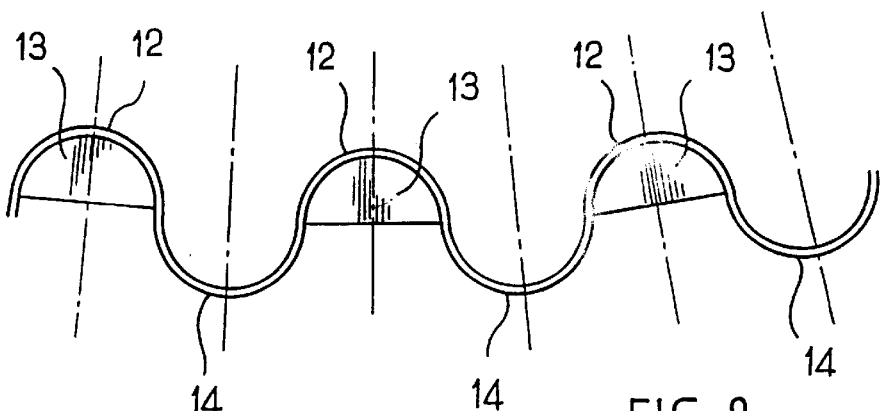
FIG_8
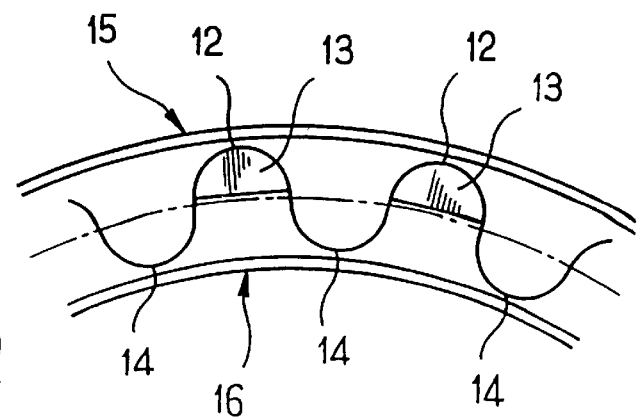
FIG_9

VEHICULAR SHOCK ABSORBER

The present invention relates to a shock absorber of undulating section and to a bumper provided with such a shock absorber.

BACKGROUND OF THE INVENTION

Motor vehicle bumpers have an outer skin which serves firstly to provide an esthetic function of extending the bottom of the front or back portion of the bodywork of the vehicle, and secondly a mechanical function of constituting an impact surface for receiving impacts to which the vehicle may be subject.

Behind the bumper skin, there is provided a shock absorber whose function is to take up the forces transmitted by the skin and to absorb the major fraction of the energy thereof before transferring it to the side rails of the vehicle.

In general, the shock absorbers are situated in line with the side rails and they are interconnected by a cross-member which transfers to them the forces to which the bumper is subject. The shock absorbers are made to measure and are quite expensive, such that in certain down-market vehicles, they are replaced by a low energy shock absorbing system of the polypropylene foam type whose sole purpose is to limit damage to the skin of the bumper in the event of small bumps.

SUMMARY OF THE PRESENT INVENTION

The present invention seeks to provide a high energy shock absorber which is not only cheaper but is also very easy to adapt to different vehicles.

The present invention provides a shock absorber for a motor vehicle, to be interposed in a bumper between a cross-member interconnecting the two side rails of the vehicle and a bumper shield, the shock absorber being characterized by the fact that it is constituted by a sheet of undulating section.

The shock absorber of the invention draws advantage from the fact that it is positioned between the cross-member and the shield, thereby giving it a large working area and correspondingly reducing the pressure to which it is subjected during a shock.

Thus, because it is of undulating section, a sheet of plastics material or of other material suffices to provide a shock absorber that is effective.

In addition, it will be understood that using a sheet of undulating section makes a degree of modularity possible, since the sheet can be cut to the desired dimensions without the entire architecture of the shock absorber needing to be redefined.

The undulating section of the shock absorber of the invention presents the advantage of being easy to mold and unmold in a mold having two parts, one of which can be moved in translation along an axis.

In addition, the rounded shapes projecting from the face (s) of the shock absorber reduce or even eliminate the phenomenon of whitening that occurs in the event of an impact on a visible part that is in contact with an absorber and when the absorber has rigid edges as is the case, for example, of a honeycomb structure.

In a first embodiment of the invention, the shock absorber includes egg-shapes in relief.

In a second embodiment, the shock absorber is corrugated in shape, which is easier to inject than the preceding embodiment because the injection flows in this case are subjected only to very little disturbance.

If the shock absorber of the invention is constituted solely by shapes of undulating section, it is possible to use a mold that is simple without inserts or other complex moving parts.

In addition, in order to obtain an undulating section, there is no need for the mold to have a surface state that is of quality as good as that required for unmolding shapes having surfaces that are parallel to the opening direction of the mold, as is the case, for example, with honeycomb reinforcement.

The shock absorber of the invention can be made by any method for transforming plastics material, i.e. not only by molding, but also by thermoforming, for example, or indeed by extrusion if a corrugated shock absorber is to be made.

In a particular embodiment of the invention, small blocks of foam fill the recesses that result from the presence of the undulating shapes, so as to increase the energy-absorbing performance of the shock absorber.

For the same purpose, ribs can be provided in the bottoms of the corrugations or egg-shapes of the shock absorber.

Such ribs can also be taken advantage of to protect headlight-washer equipment as is conventionally received in a location at the front of the vehicle that is highly exposed to impacts. To this end, the array of ribs can be made locally more dense so as to shelter the equipment.

In an embodiment of the invention, the shock absorber possesses symmetry, planar relative to its midplane, or central relative to a point of its midplane, so that it can be put into position equally well in either direction, thus facilitating installation.

The present invention also provides a bumper provided with a shock absorber as described above.

In a particular embodiment, the shock absorber is integrated in the bumper e.g. being integrally molded with the skin of the bumper which, in cross-section has a setback forming the said shock absorber.

In which case, the bumper may optionally include a cover closing the opening which appears in the skin because of the presence of the integrated shock absorber.

In a particular embodiment, in which the shock absorber has egg-shapes in relief, the shock absorber is placed in the bumper in such a manner that the concave sides of the egg-shapes face towards the front of the vehicle.

In another embodiment that is compatible with the preceding embodiments, the bumper includes corners at its side ends and the axes of the corrugated shapes or egg-shapes of the shock absorber situated in the vicinity of said corners face in the direction from which impacts are statistically most likely, i.e. a direction substantially perpendicular to the surface of the skin of the bumper overlying each corrugated shape or egg-shape.

The shock absorber of the invention is suitable for use not only in bumpers, as already explained, but also in any vehicle bodywork part such as a door panel or a fender, in particular because it is very flexible and can be installed between two parts following the curvature thereof and without requiring special preparation.

DESCRIPTION OF THE DRAWINGS

In order to make the invention more understandable, there follows a description of embodiments given as non-limiting examples with reference to the accompanying drawings, in which:

FIG. 1 is a perspective view of a portion of a shock absorber constituting a first embodiment of the invention;

FIG. 2 is a perspective view of a portion of a shock absorber constituting a variant of this embodiment of the invention;

FIG. 3 is a perspective view of a bumper provided with an integrated shock absorber;

FIG. 4 is a section on IV—IV of FIG. 3;

FIG. 5 is a section on V—V of FIG. 3;

FIG. 6 is a view analogous to FIG. 5 showing a variant in which each egg-shape is reinforced by an internal rib;

FIG. 7 is a perspective view of a shock absorber constituting a second embodiment of the invention;

FIG. 8 is a section on VIII–VIII of FIG. 6; and

FIG. 9 is a section view of the shock absorber of FIGS. 7 and 8 when installed.

DETAILED DESCRIPTION OF THE INVENTION

The shock absorber shown in part in FIG. 1 is constituted by a plate 1 having egg-shaped protuberances 2 formed to project therefrom on axes perpendicular to the plate.

The shape of each projection 2 and the thickness of the plate 1 are determined as a function of the mechanical performance that it is desired to achieve with the shock absorber.

Such a shock absorber can be obtained by molding without any difficulty, given that it has no surfaces perpendicular to the plate, thus facilitating both opening of the mold and ejection of the molded part.

The shock absorber of FIG. 1 can also be obtained by thermoforming using known methods.

In the variant shown in FIG. 2, the shock absorber likewise comprises a plate 3 having projections formed to project therefrom.

In this variant, projections are provided in two different sizes, namely: large-sized projections 4 designed to absorb the energy of low-energy shocks, and small-sized projections 5 which are disposed more densely and which serve to absorb the energy of larger shocks.

The bumper shown in FIGS. 3 to 6 comprises a skin 6 with an integrated shock absorber 7 whose egg-shapes 8 have their concave sides facing towards the front of the vehicle.

As can be seen in FIG. 5, the shock absorber 7 is made integrally with the remainder of the bumper, so the bumper has a longitudinal opening 9 in its front face.

A cover 10 in the form of a strip is fitted over this opening 9 to close it.

It will be understood that the shape of the bumper including the shock absorber is suitable for manufacture by molding, given that this shape is easily unmoldable.

In the variant shown in FIG. 6, the bottom of each egg-shape 8 has a reinforcing rib 8b.

As can be seen in FIGS. 3 and 4, the bumper has corners 11 at each of its side ends, and beyond the corners it has side portions for covering the front side portions of the vehicle (not shown).

Within each corner 11, the shock absorber has egg-shaped projections 8a whose axes are not accurately parallel to the longitudinal axis of the vehicle, but diverge slightly so that the corresponding egg-shapes face in the directions from which they are most likely to receive an impact, which directions are substantially perpendicular to the surface of the bumper skin 6 over each egg-shape.

In other words, the egg-shapes in the corners of the shock absorber extend in directions suitable for withstanding corner impacts.

Nevertheless, as can be seen in FIG. 4, these two egg-shapes 8a are still shaped so as to allow the bumper to be unmolded without any undercut, merely by moving in translation on the axis of the vehicle, so that unmolding the bumper remains an operation that is simple.

The shock absorber of FIGS. 7 to 9 is in the form of a corrugated plate 11.

The top corrugations 12 (as shown in the drawing) are reinforced by ribs 13 parallel to the longitudinal direction of the shock absorber, said ribs being intended to oppose collapse of the top half of the shock absorber.

However, because of the presence of these ribs, the top corrugations of the shock absorber provide no latitude for curving the shock absorber to match the curved shape of a visible part that is to be reinforced.

The deformation that results from such curving is therefore accommodated by the bottom corrugations 14 of the shock absorber.

Furthermore, as already explained, the corrugations can be made to be locally more numerous so as to protect headlight-washer equipment.

In the particular case of a rear bumper for a station wagon, a motor manufacturer requirement is for the horizontal top portion of the bumper, which forms a top ledge, to be able to carry a large weight since it is situated at the loading threshold for the trunk. The ribs 13 can then contribute to supporting this top ledge, by being located on the top edge of the shock absorber, as shown in FIG. 7.

As can be seen in FIG. 9, the shock absorber can be located between the skin 15 and a cross-member 16 of the bumper, following the curve thereof, with the bottom corrugations 14 being in contact with the cross-member.

The shock absorber of the invention is particularly advantageous when, as is usually the case, the idea is to house a shock absorber structure between a bumper skin and cross-member that are spaced apart by 30 mm to 40 mm only. In this respect, the shock absorber of the invention very advantageously replaces honeycomb structures which, although capable of being interposed in such a small space, are nevertheless too rigid to provide effective absorption of low-energy impacts.

Naturally, the embodiments described above are not limiting in any way and can be modified in any desirable manner without thereby going beyond the ambit of the invention.

What is claimed is:

1. A shock absorber for a vehicle, having a bumper a and a cross-member interconnecting two side rails of the vehicle, comprising:

only one layer comprising a sheet having an undulating section defining undulating shapes each having a concavity, wherein the shock absorber is interposable between the cross-member and the bumper to primarily absorb energy from an impact and each of the concavities having an axis which is substantially parallel to a direction of potential impact.

2. A shock absorber according to claim 1, wherein the concavities are egg shaped.

3. A shock absorber according to claim 1, wherein the sheet is corrugated.

4. A shock absorber according to claim 1, further comprising blocks of foam that fill the concavities.

5. A shock absorber according to claim 1, further comprising a rib in the bottom of at least one of the concavities.

6. A shock absorber according to claim 1, wherein the shock absorber is symmetrical relative to at least one of a midplane of the shock absorber and a point in the midplane.

7. A shock absorber according to claim 1, wherein the shock absorber follows the curvature of the bumper without requiring any special preparation.

8. A bumper fitted with a shock absorber according to claim 1.

9. A bumper according to claim 8, wherein the shock absorber is integral with the bumper.

10. A bumper according to claim 9, wherein the sheet is molded in a skin of the bumper.

11. A bumper according to claim 10, wherein the bumper further comprises a cover closing the concavities.

12. A bumper according to claim 8, wherein the shock absorber has egg-shapes, and the shock absorber is placed in the bumper in such a manner that the egg shapes face towards the front of the vehicle.

13. A bumper according to claim 8, further including corners at its side ends, wherein axes of the concavities of the shock absorber are situated in the vicinity of said corners and face in a direction substantially perpendicular to the bumper.

14. A shock absorber for a motor vehicle, to be interposed between a cross-member interconnecting the two side rails of the vehicle and a bumper, comprising a sheet of undulating section defining undulating shapes each having a concavity, and a rib in the bottom of at least one of the concavities.

15. A shock absorber for a motor vehicle, to be interposed between a cross-member interconnecting the two side rails of the vehicle and a bumper, comprising a sheet of undulating section defining undulating shapes each having a concavity, the shock absorber is made by molding a skin of the bumper.

16. A shock absorber assembly for a motor vehicle, having a cross-member interconnecting two side rails of the vehicle, comprising:
   a bumper; and
   a shock absorber including only one layer comprising a sheet having an undulating section defining undulating shapes each having a concavity,
   wherein the shock absorber assembly is connected to the cross member such that the shock absorber is interposed between the cross-member and the bumper to primarily absorb energy from an impact and each of the concavities having an axis which is substantially parallel to a direction of impact.

17. A shock absorber assembly according to claim 16, wherein the concavities are egg shaped.

18. A shock absorber assembly according to claim 16, further comprising a rib in the bottom of at least one of the concavities.

19. A shock absorber assembly according to claim 16, wherein the shock absorber is symmetrical relative to at least one of a midplane of the shock absorber and a point in the midplane.

20. A method for enhancing the shock absorption of a vehicle having a bumper and a cross-member interconnecting two side rails of the vehicle, comprising:
   providing a shock absorber on the vehicle;
   wherein the shock absorber includes only one layer comprising a sheet having an undulating section defining undulating shapes each having a concavity;
   the shock absorber is interposed between the cross-member and the bumper to primarily absorb energy from an impact; and
   each of the concavities has an axis which is substantially parallel to a direction of potential impact.

21. A method according to claim 20, wherein the providing step further comprises integrally forming the shock absorber with the bumper.

* * * * *